United States Patent [19]
Hicks

[11] Patent Number: 5,437,225
[45] Date of Patent: Aug. 1, 1995

[54] DEVICE FOR REMOVING PITS FROM CHERRIES CLEANLY WITH A SINGLE HOLE

[76] Inventor: Violet E. Hicks, P.O. Box 3, Tenino, Wash. 98589

[21] Appl. No.: 258,474
[22] Filed: Jun. 10, 1994
[51] Int. Cl.$^6$ .................... A23N 4/12; A47J 23/00
[52] U.S. Cl. .................................... 99/547; 30/113.1
[58] Field of Search ............... 99/547, 548, 549, 551, 99/553, 559; 30/113.1

[56] References Cited
U.S. PATENT DOCUMENTS

| | | | |
|---|---|---|---|
| 135,050 | 1/1873 | Warner | 99/547 |
| 668,821 | 2/1901 | Long | 99/547 |
| 1,035,008 | 8/1912 | Hendrick | 99/547 |
| 1,082,516 | 12/1913 | Griffith | 99/547 |
| 1,220,854 | 3/1917 | Jones | 30/113.1 |

Primary Examiner—David A. Scherbel
Assistant Examiner—Reginald L. Alexander

[57] ABSTRACT

A device for removing pits from cherries cleanly with a single hole comprising a chain having a circular cross section and having a first end and a second end, the chain being formed of stranded wires; the second end being formed with a ring positioned about a central extent of the chain for providing a loop to be used as a handle during operation and use; and the first end of the device being configured into a pointed remote end and a central aperture with one flat surface for contacting a prying out the pit from a cherry when the pointed end is inserted into the stem end of the cherry.

1 Claim, 3 Drawing Sheets

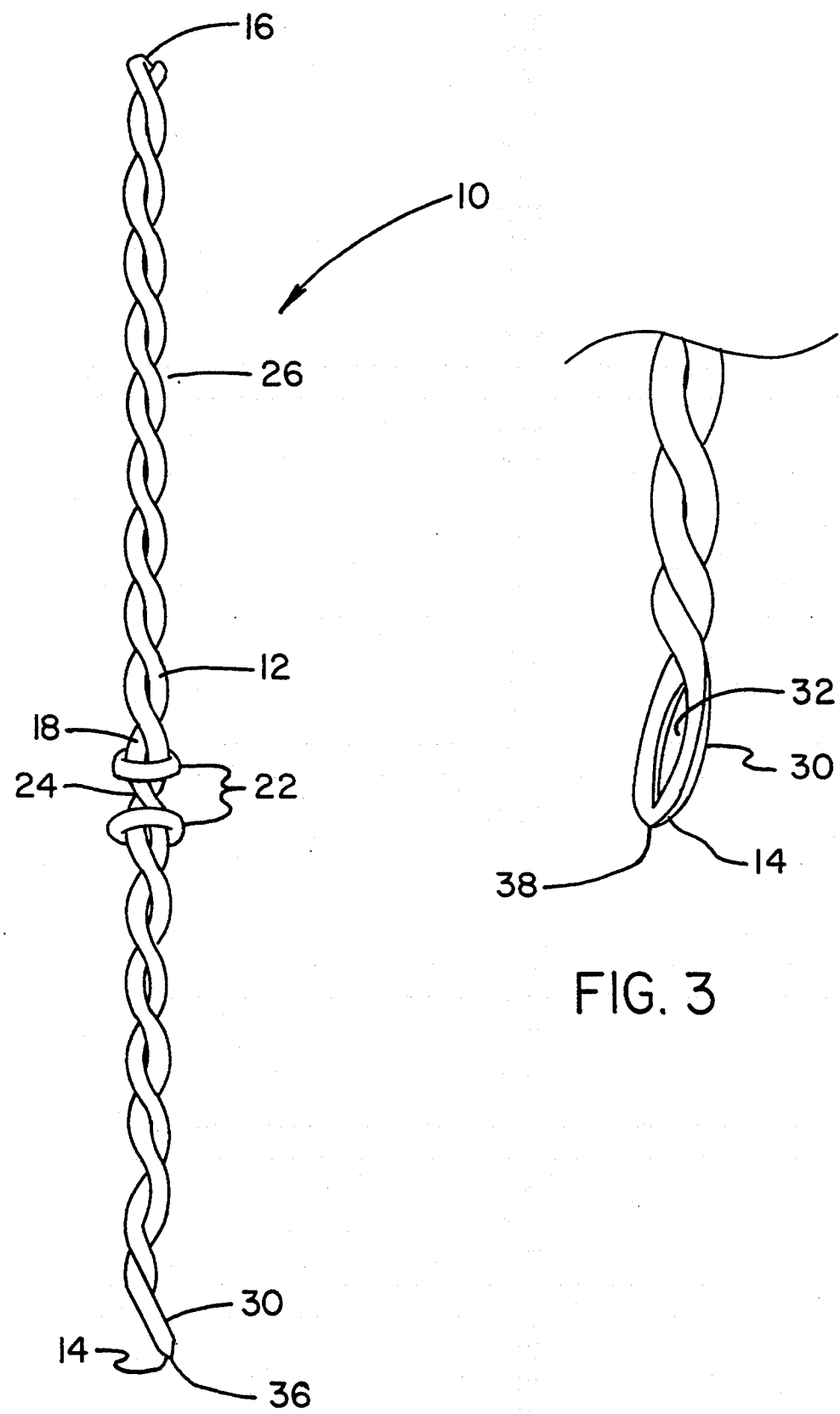

PRIOR ART

DEVICE FOR REMOVING PITS FROM CHERRIES CLEANLY WITH A SINGLE HOLE

BACKGROUND OF THE INVENTION

1. Field of the Invention

The present invention relates to device for removing pits from cherries cleanly with a single hole and more particularly pertains to removing pits from cherries in the cleanest most efficient manner.

1. Description of the Prior Art

The use of cherry pitters and seed removers is known in the prior art. More specifically, cherry pitters and seed removers heretofore devised and utilized for the purpose of removing pits and seeds from cherries and other fruit are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 330,833 to Cheung discloses the design of a cherry pitter.

U.S. Pat. No. Des. 317,107 to Grass discloses the design of a cherry pitter or similar article.

U.S. Pat. No. Des. 265,539 to Pavelka discloses the design of a cherry pitter machine.

U.S. Pat. No. 3,965,809 to Kieldsen et al. discloses a fruit pitting apparatus.

U.S. Pat. No. 3,731,615 to Margaroli et al. discloses a cherry pitter.

In this respect, the device for removing pits from cherries cleanly with a single hole according to the present invention substantially departs from the conventional concepts and designs of the prior art, and in doing so provides an apparatus primarily developed for the purpose of removing pits from cherries in the cleanest most efficient manner.

Therefore, it can be appreciated that there exists a continuing need for new and improved device for removing pits from cherries cleanly with a single hole which can be used for removing pits from cherries in the cleanest most efficient manner. In this regard, the present invention substantially fulfills this need.

SUMMARY OF THE INVENTION

In view of the foregoing disadvantages inherent in the known types of cherry pitters and seed removers now present in the prior art, the present invention provides an improved device for removing pits from cherries cleanly with a single hole. As such, the general purpose of the present invention, which will be described subsequently in greater detail, is to provide a new and improved device for removing pits from cherries cleanly with a single hole and method which has all the advantages of the prior art and none of the disadvantages.

To attain this, the present invention essentially comprises a new and improved device for removing pits from cherries cleanly with a single hole comprising, in combination, a wire chain with a circular cross section and having a first operative end and a second inoperative end, the chain being formed of a pair of stranded wires; the second end being formed with rings positioned about a central extent of the chain for providing a loop to be used as a handle during operation and use; and the first end of the device being formed of a single wire configured into a pointed remote end and a central aperture with one flat surface for contacting a prying out the pit from a cherry when the pointed end is inserted into the stem end of the cherry and the opposite surface of the single wire being formed curved from the curvature of the wire.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly form a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved device for removing pits from cherries cleanly with a single hole which have all the advantages of the prior art cherry pitters and seed removers and none of the disadvantages.

It is another object of the present invention to provide new and improved device for removing pits from cherries cleanly with a single hole which may be easily and efficiently manufactured and marketed.

It is further object of the present invention to provide new and improved device for removing pits from cherries cleanly with a single hole which are of durable and reliable constructions.

An even further object of the present invention is to provide new and improved device for removing pits from cherries cleanly with a single hole which are susceptible of a low cost of manufacture with regard to both materials and labor, and which accordingly are then susceptible of low prices of sale to the consuming public, thereby making such device for removing pits from cherries cleanly with a single hole economically available to the buying public.

Still yet another object of the present invention is to provide new and improved device for removing pits from cherries cleanly with a single hole which provide in the apparatuses and methods of the prior art some of the advantages thereof, while simultaneously overcoming some of the disadvantages normally associated therewith.

Still another object of the present invention is to removing pits from cherries in the cleanest most efficient manner.

Lastly, it is an object of the present invention to provide new and improved device for removing pits from cherries cleanly with a single hole comprising a chain having a circular cross section and having a first end and a second end, the chain being formed of stranded wires; the second end being formed with a ring positioned about a central extent of the chain for providing a loop to be used as a handle during operation and use; and the first end of the device being configured into a pointed remote end and a central aperture with one flat surface for contacting a prying out the pit from a cherry when the pointed end is inserted into the stem end of the cherry.

These together with other objects of the invention, along with the various feature of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the device as illustrated in FIG. 1.

FIG. 3 is an enlarged perspective showing of the lower end of the device shown in the prior Figures.

The same reference numerals refer to the same parts through the various Figures.

DESCRIPTION OF THE PREFERRED EMBODIMENT

Figure 1:
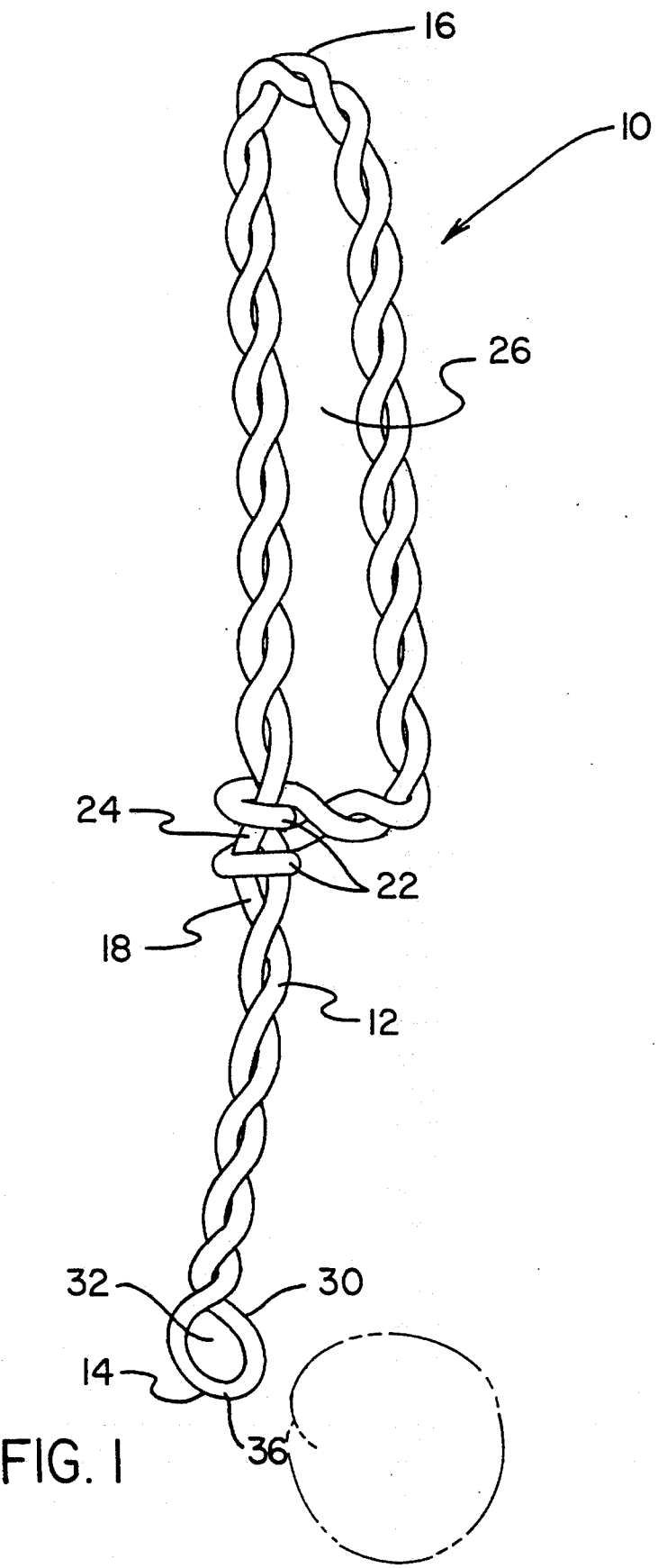
FIG. 1 is a perspective view of the preferred embodiment of the device for removing pits from cherries cleanly with a single hole constructed in accordance with the principles of the present invention.
Figure 4:
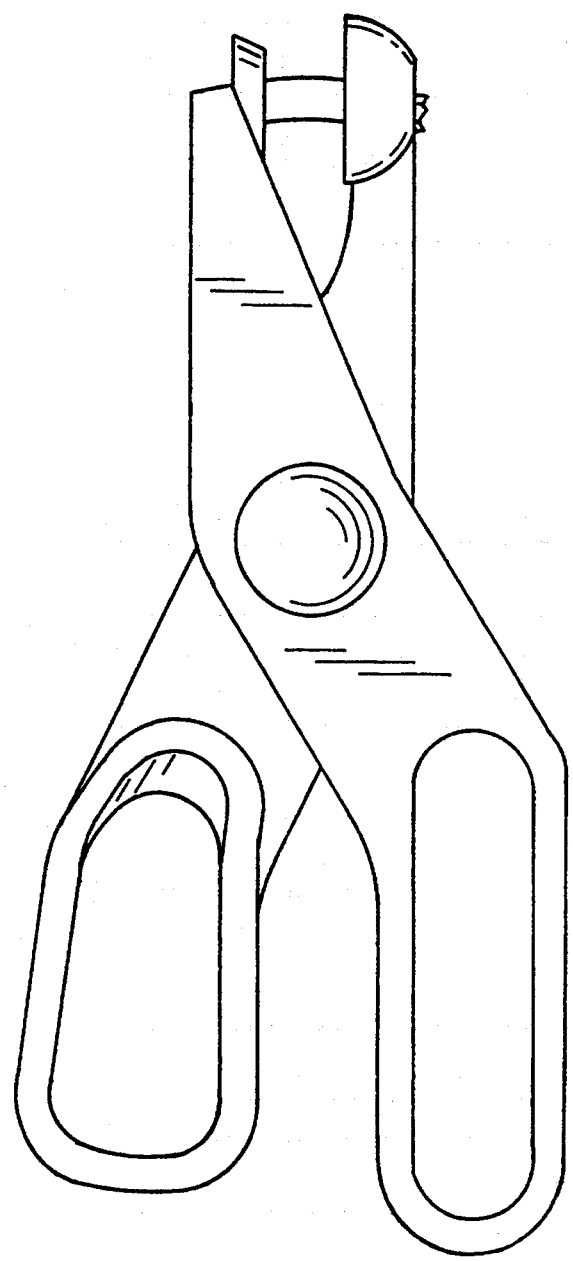
FIG. 4 is a front elevational view of a known prior art cherry pitter.
Figure 5:
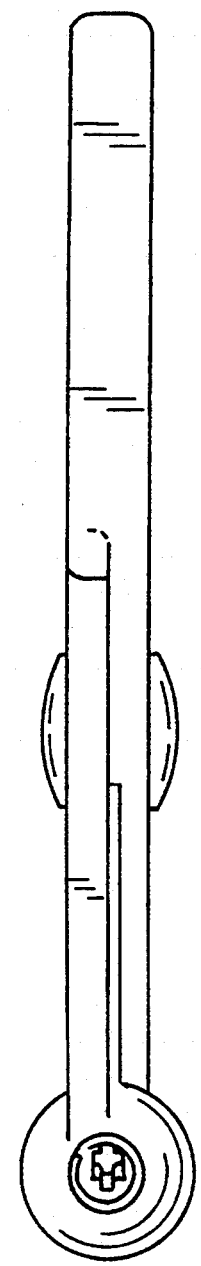
FIG. 5 is a side elevational view of the prior art cherry pitter as illustrated in FIG. 4.

With reference now to the drawings, and in particular to FIG. 1 thereof, the preferred embodiment of the new and improved device for removing pits from cherries cleanly with a single hole embodying the principles and concepts of the present invention and generally designated by the reference numeral 10 will be described.

The present invention, the new and improved device for removing pits from cherries cleanly with a single hole, is comprised of a plurality of components. Such components, in their broadest context, include a wire chain, a first end to be used as a handle and a second end with a point and a hole to be inserted into the stem end of a cherry for contacting and prying out the pit from the cherry.

The components of the present invention constitute a system 10 wherein the individual components are specifically configured and correlated with resect to each other so as to attain the desired objectives.

More specifically, the principle component of the present system 10 is a wire chain 12. Such chain is fabricated with a circular cross sectorial configuration except at the tip end as will be described hereinafter.

The chain is provided with a first operative end 14. It is also provided with a second operative end 16. There is a central extent 24 between the first and second ends. The chain is formed over its entire length of a single wire 18 twisted about itself.

Functioning as a second component of the system is the second end 16 of the device. The second end is formed with rings 22. The rings are positioned about a central extent 24 of the chain. The rings thus provide a loop 26 at the upper end of the device to be used as a handle during operation and use in the removal of pits from cherries.

The next component of the system is the first end 14 of the device. Such first end is formed of a single wire 30. Such wire is configured into a point 36. Such wire is also configured to form a central aperture 32. The aperture assists in the temporary securement of the pit to the wire while being pried out from the cherry. The prying out is further assisted by having the first end formed with one flat surface 38. Such surface is at an obtuse angle with the adjacent portion of the wire. The surface of the single wire at the first end opposite from the flat surface is formed curved in cross section from the curvature of the wire.

The present invention is easy to use and extremely effective. Most conventional cherry pitters put two holes in every cherry and do not give a clean cut. With the present invention the user gets a single cleanly cut hole. It is made from two steel wires that are twisted together. There is an elongated loop at one end that forms the handle. Extending out from the handle, there is a straight section or intertwined double wire leading to a small circular loop of single wire that does the actual pitting. The pitting end is bent up slightly like a spoon and the edges are slightly sharpened. The user simply inserts the pitter into the stem end of the cherry and in a simple motion, scoops out the pit.

The present invention will last through a lifetime of use. It is not only easy to use but also easy to clean. It will be especially useful to those who use large quantities of cherries for canning, salads, etc. In such cases, efficiency is of paramount importance, and this is what this device delivers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and cages will readily occur to those skilled in the art, it is not desired to limit the invention to the exact construction and operation shown and described, and accordingly, all suitable modifications and equivalents may be resorted to, falling within the scope of the invention.

The invention claimed is:

1. A new and improved device for removing pits from cherries cleanly with a single hole comprising, in combination:

a wire with a circular cross section and having a first operative end and a second inoperative end and a central extent therebetween, the wire being formed of a single wire twisted about itself;

the second end of the wire being formed with rings positioned about the central extent of the wire for providing a loop formed by the wire between the central extent and the second end to be used as a handle during operation and use; and the first end of the wire being configured into a pointed remote end and a central aperture therethrough with one flat surface for contacting and prying out the pit from a cherry when the pointed end is inserted into the stem end of the cherry and the opposite surface of the wire being formed curved from the curvature of the wire.

* * * * *